United States Patent

Jetzt

[15] 3,676,589

[45] July 11, 1972

[54] VIDEO INVERSION TECHNIQUE TO COUNTERACT SLOWLY MOVING INTERFERENCE PATTERNS IN A VIDEO COMMUNICATIONS SYSTEM

[72] Inventor: John J. Jetzt, Lincroft, N.J.

[73] Assignee: Bell Telephone Laboratories, Incorporated, Murray Hill, Berkeley Heights, N.J.

[22] Filed: Nov. 16, 1970

[21] Appl. No.: 89,621

[52] U.S. Cl.....................178/6.8, 178/DIG. 12, 178/DIG. 13

[51] Int. Cl...........................................................H04n 5/14

[58] Field of Search......................178/6.8, DIG. 12, DIG. 13, 178/5.1

[56] References Cited

UNITED STATES PATENTS

| | | | |
|---|---|---|---|
| 3,069,492 | 12/1962 | D'Agostini | 178/5.1 |
| 3,453,386 | 7/1969 | Hofmann | 178/DIG. 12 |

*Primary Examiner*—Robert L. Griffin
*Assistant Examiner*—Richard K. Eckert, Jr.
*Attorney*—R. J. Guenther and E. W. Adams, Jr.

[57] ABSTRACT

To virtually eliminate from a video channel the interference due to the horizontal synchronization pulses of another juxtaposed video channel, the video portion of each composite video signal is inverted in every other field prior to transmission of the same. Then at each receiver, the video is reinverted to recover the original video signal. As a result, the interfering horizontal pulses alternate in polarity in alternate scan fields and thus tend to be neutralized because of the integration effects of the human eye.

1 Claim, 2 Drawing Figures

INVENTOR
J. J. JETZT
BY John K. Mulvaney
ATTORNEY

VIDEO INVERSION TECHNIQUE TO COUNTERACT SLOWLY MOVING INTERFERENCE PATTERNS IN A VIDEO COMMUNICATIONS SYSTEM

BACKGROUND OF THE INVENTION

This invention relates to video communications systems and more particularly to apparatus for counteracting crosstalk and intermodulation distortion which results when two or more video signals are transmitted over a common transmission facility.

When two or more composite video or visual telephone signals (i.e., PICTUREPHONE signals) are frequency multiplexed over a common transmission facility, intermodulation distortion produces interference from one video channel to another. The interference most objectionable is that due to the high amplitude horizontal synchronization pulses, which typically creates a slowly moving vertical bar on the screen of a receiver's video set (commonly called the "windshield wiper" effect). This interference pattern is either stationary or, more often, slowly moving because the horizontal pulse frequencies of the various PICTUREPHONE sets are within a few cycles per second (Hz) of each other and are not phase-locked to one another.

The aforementioned interference pattern is encountered less often in commercial or entertainment television presumably because the few channels multiplexed over a common transmission link, such as a radio relay system, can be widely separated in frequency thus reducing the likelihood of crosstalk and intermodulation effects. PICTUREPHONE communication, on the other hand, requires the transmission of a large number of channels over a common transmission facility and hence a much reduced frequency separation between the respective channels. This increases the likelihood of intermodulation distortion.

For short-haul transmission, the composite PICTUREPHONE signals are sent in baseband analog form over respective cable pairs. And, here again, crosstalk and/or intermodulation distortion produces the above-noted interference between juxtaposed wire pairs.

Accordingly, it is the primary object of the present invention to counteract and virtually eliminate the objectionable interference due to the horizontal synchronization pulses of other proximate video channels.

SUMMARY OF THE INVENTION

In accordance with the present invention it is proposed that rather than transmit each composite video signal in the usual format, the video portion of each composite signal be inverted in every other field. Then at each receiver, the video is reinverted to recover the original version of the received video signal. Thus, the aforementioned interference that would normally manifest itself as a darker (or lighter) than ambient vertical bar, now appears darker than ambient for one field and lighter than ambient for the next, and so on. Because of the high field rate, the eye tends to integrate the alternate dark and light vertical bars and thus in effect eliminates the same.

BRIEF DESCRIPTION OF THE DRAWING

The invention will be more fully appreciated from the following detailed description when the same is considered in connection with the accompanying drawings in which.

DETAILED DESCRIPTION

Figure 1:
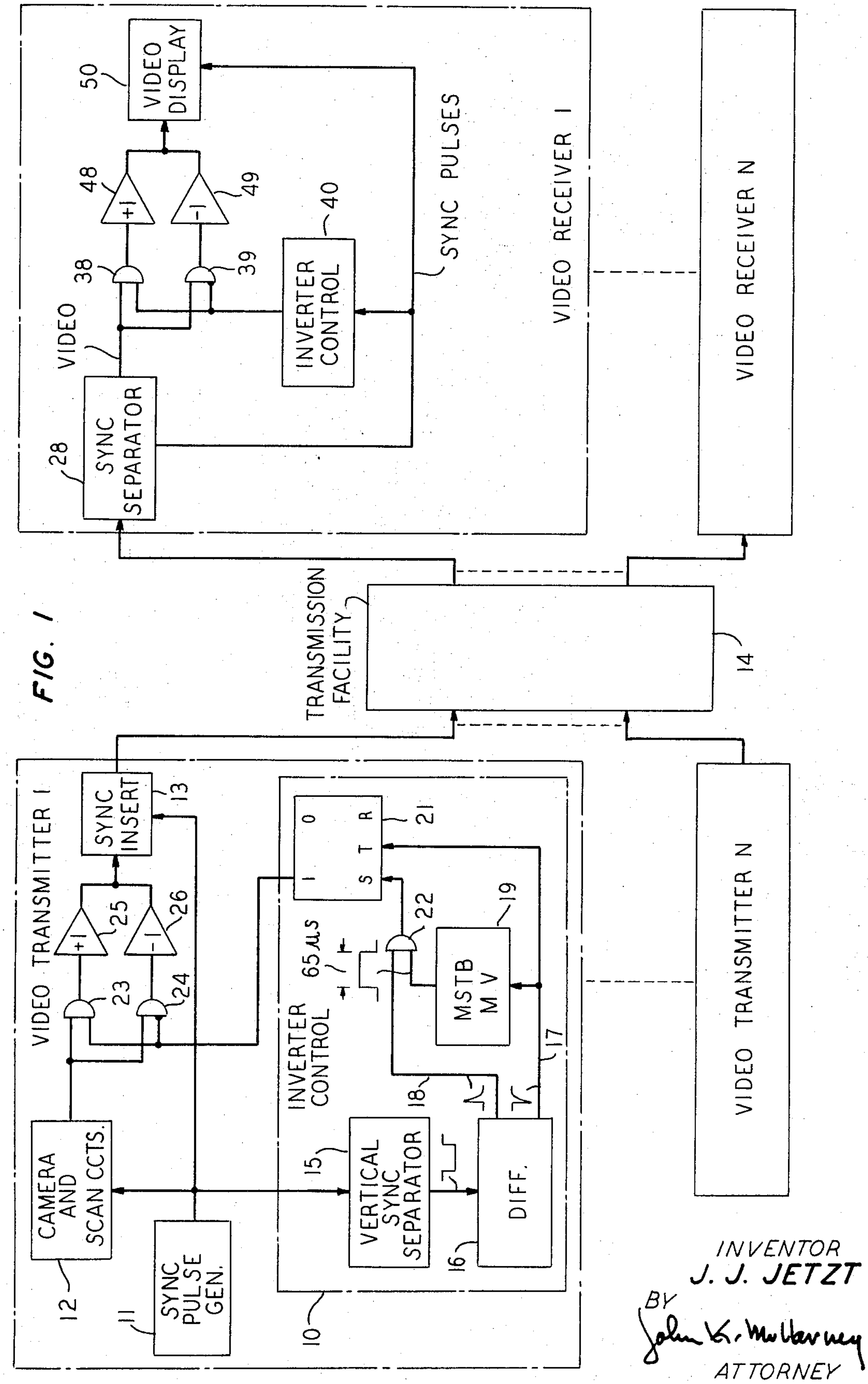
FIG. 1 shows a schematic block diagram of a video communications system incorporating apparatus in accordance with the invention.

Turning now to FIG. 1 of the drawings, a typical video telephone transmitter is shown to comprise a synchronization or "sync" pulse generator 11 for generating the requisite horizontal and vertical synchronization pulses. These sync pulses are delivered to scan circuits 12 so as to cause a desired electron beam scan of the scene imaged on the camera of the video set. The sync pulses are also delivered to the sync insertion circuit 13 wherein they are inserted into the video signal derived from the camera. The composite output signal from the sync insert circuit 13 thus comprises the video provided by the camera, and appropriately spaced, interspersed, horizontal and vertical sync pulses. The above circuits are of known design and they comprise part of the standard PICTUREPHONE set. The PICTUREPHONE system is now in commercial use and has been extensively described in the literature (see, for example, the May/June 1969 issue of the Bell Laboratories Record) and therefore a detailed description of the same herein is not believed warranted. It is sufficient for present purposes to note that the picture signal is composed of about 250 active lines per frame, displayed at a frame rate of 30 frames per second on a 5 ½-inch by 5-inch screen, with 2 interlaced fields per frame. Interlacing is a well known technique providing known advantages.

The video signal derived from the video camera is illustrated in FIG. *2a*. Only two lines of each of the interlaced fields are shown since space limitations prevent the display of a complete frame and only two lines of each field are necessary to provide an adequate understanding of the present invention. The video signal from the camera is inverted in alternate fields as illustrated in FIG. *2b*, for the purpose and in the manner to be described in detail hereinafter. The horizontal (and vertical) sync pulses are inserted in this video signal by sync insert circuit 13, as further shown in FIG. *2b*. As will be appreciated by those in the art, a horizontal sync pulse precedes each line of video information and a vertical sync pulse (not shown) precedes each field. The vertical sync pulses are of the same polarity as the horizontal sync pulses and they are of substantially longer duration.

The composite output signal from sync insert 13 is delivered to the transmission facility 14. In similar fashion, composite output signals from one or more other video transmitters are also delivered to the transmission facility. This common transmission facility may comprise a radio relay system or a coaxial cable transmission system, in which case the baseband video signals are modulated onto distinct carriers and transmitted in a frequency multiplexed fashion. Alternatively, and especially for short distances, the transmission facility 14 may comprise a cable having multiple wire pairs, with the various composite video signals transmitted over distinct wire pairs in analog form. In fact, an actual transmission path may comprise a combination of the aforementioned transmission facilities. For example, a number of video signals of different subscribers may be transmitted on cable pairs to a nearby central office, then frequency multiplexed over a radio relay link to a remote central office, and thence demultiplexed and transmitted once again in analog form over cable pairs to their respective destinations. The actual transmission facility utilized is of no consequence and each is subject to the type of objectionable interference to which the present invention is directed.

Figure 2:
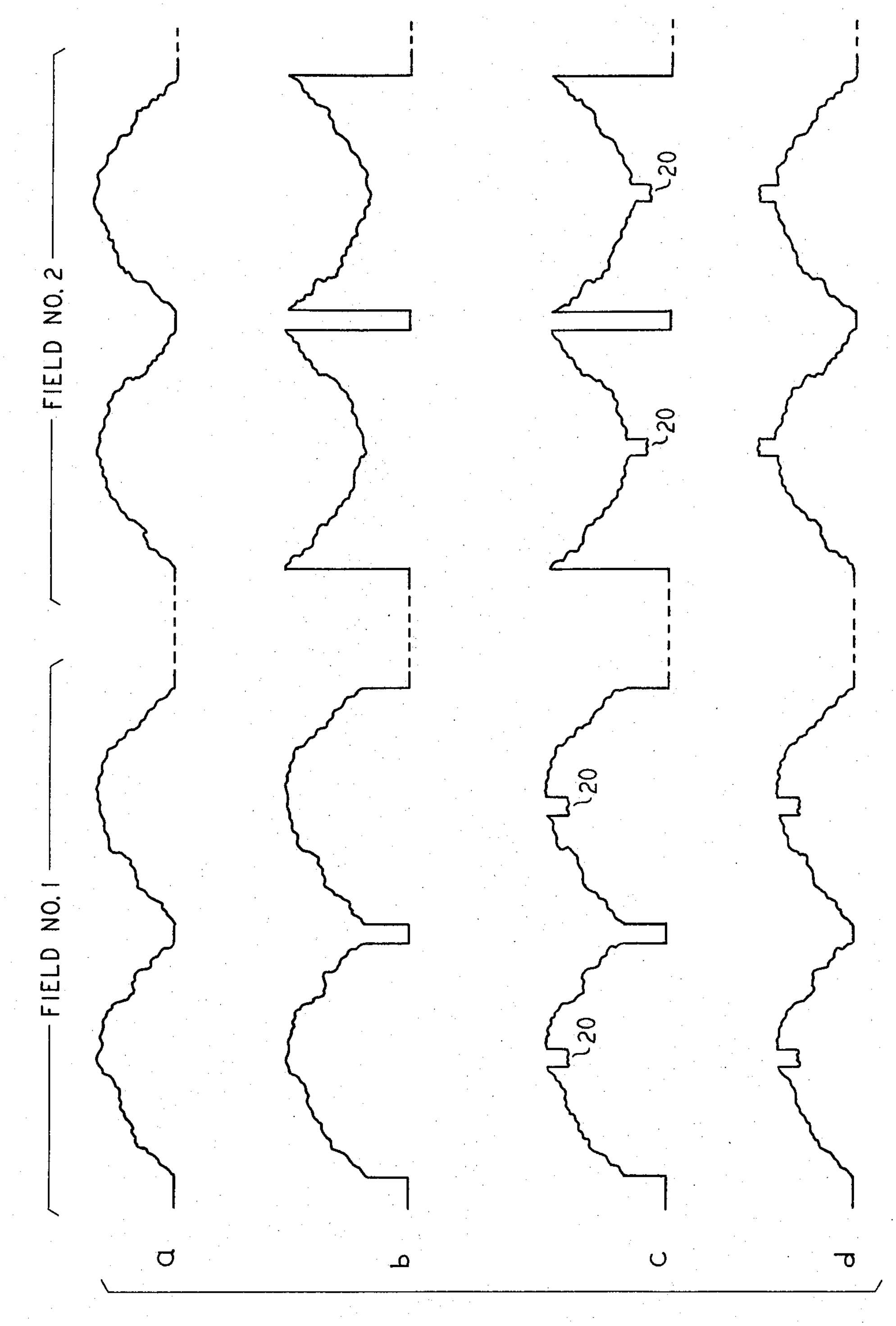
FIG. 2 shows certain waveforms useful in the explanation of the invention.

Now as indicated hereinbefore, when two or more composite video signals are transmitted over a common transmission facility, crosstalk and intermodulation distortion produces interference from one video channel to another juxtaposed one. Such interference occurs between video signals that are frequency juxtaposed, as in frequency multiplexed transmission systems, as well as between baseband video signals which are transmitted over distinct cable pairs that are in close space-juxtaposition. The interference most objectionable, in each case, is that due to the high amplitude horizontal sync pulses, which typically creates a slowly moving vertical bar on the screen of a receiver's video set. The waveform of FIG. 2c illustrates this interference. Because of the aforementioned crosstalk and/or intermodulation distortion between juxtaposed video channels, the horizontal sync pulses of one channel will produce the interference spikes 20 of FIG. *2c* in the video of another channel. Since the video transmitters are not phase-locked to one another, this interference invariably shows up in the video portion of the other channel. Thus, when the lines of the first field are displayed on the screen of the intended receiver set, the interference 20, which appears at essentially the same position in each line of this first field, results in a darker than ambient vertical bar. Now if the interlaced fields are transmitted in the usual format (i.e., no video inversion), the display of the second field on the screen of the receiver set also results in a darker than ambient vertical bar that is aligned with and visually reinforces the vertical bar of the first field. And, each succeeding field similarly produces a darker than ambient vertical bar. Due to manufacturing deviations and the like, the master clock pulse sources of the various PICTUREPHONE sets are not completely synchronous but rather operate within several cycles per second or Hz of each other and therefore the resultant interference pattern appears to drift or move slowly across the display screen. Hence, the descriptive term "windshield wiper" effect is given to this type interference.

To counteract this interference, it is proposed in accordance with the present invention that the video portion of each composite video signal be inverted in every other field. Thus, as shown in FIG. 2*b*, the video of the second field is inverted prior to transmission of the same over a common transmission facility. The video of each succeeding alternate field (e.g., all even numbered fields) is similarly inverted. The interference spikes 20, of course, also show up in the inverted video, as shown in FIG. 2*c*. However, at the intended receiver, the video portions that were initially inverted are now reinverted to recover the original version of the video signal. In the process, the interference that manifested itself as a darker than ambient vertical bar, now appears darker than ambient for one field (i.e., field number 1) and lighter than ambient for the next (i.e., field number 2), as depicted in FIG. 2d, and so on. Due to the high field rate, the human eye tends to integrate the alternate dark and light vertical bars and thus in effect eliminates the same. It perhaps should be noted that because of the slow-moving nature of this interference as compared to the high field rate, the vertical bar of one field is only negligibly displaced with respect to the vertical bar of the next and therefore a substantially complete neutralization or integration effect is realized.

As will be appreciated by those in the art, interference between more than two channels may exist in practice. Thus, instead of a single interfering horizontal spike per video line, as shown in FIG. 2*c*, there may in fact be several. Nevertheless, each of the same will be virtually eliminated by the inversion technique of the present invention. Further, the interference spikes such as depicted in FIG. 2*c* might, in fact, be of a polarity the opposite of that shown. However, as will be apparent, the video inversion technique of the invention will result in neutralization of the interfering horizontal spikes or pulses irrespective of the polarity of the same. Moreover, several interfering spikes or pulses of different polarities might be present in a given video signal, yet each of the same will be virtually eliminated in the manner described.

Turning now to the apparatus of the present invention, the sync pulses from generator 11 are delivered to a vertical sync separator 15, of conventional design, wherein the vertical sync pulses are separated out and passed on to differentiator 16. The differentiator produces, in a typical fashion, negative-going spikes over lead 17, which are time coincident with the negative-going transitions (i.e., the leading edges) of the input vertical sync pulses. The trailing edged or positive-going transitions of the vertical sync pulses, when differentiated, produce positive-going spikes over lead 18. The negative-going spikes from differentiator 16 are coupled to the input of the monostable multivibrator 19 and to the toggle input (T) of the flip-flop or bistable multivibrator 21. Flip-flop 21 can be of any known design and the toggle input thereto alters the state of the same; i.e., if the flip-flop 21 is in its set state, it is reset, and if in the reset state, it is set. This is conventional. The positive-going spikes from the differentiator 16 are coupled to AND gate 22. The other input to this AND gate comprises a gating pulse derived from the monostable multivibrator 19. The monostable 19 is designed, or set, to provide a gating pulse of approximately 65 microseconds duration, for the reason to be described.

For picture interlace purposes, the PICTUREPHONE set has been designed to provide vertical sync pulses of alternating duration (i.e., approximately 34 and 96 μsec., respectively). Thus, the first field will be preceded by a vertical sync pulse of 34 μsec. duration; the second field by a vertical sync pulse of 96 μsec.; the next field by a vertical sync pulse again of 34 μsec., and so on. The present invention makes advantageous use of this feature to achieve the above-described video inversion in a very simple manner that requires a minimum of circuit apparatus. As will be appreciated hereinafter, it makes little difference for present purposes whether the shorter duration, vertical sync pulses lead or lag the longer duration sync pulses.

Returning now to FIG. 1, it will be assumed herein that the vertical sync pulse preceding the first field is of 34 μsec. duration. The initial negative-going spike output from differentiator 16 serves to trigger the monostable multivibrator 19 to its unstable state and it further serves to toggle the flip-flop 21 to its alternate state, as heretofore explained. The initial state of flip-flop 21 is of no consequence. In the unstable state, the monostable 19 delivers a gating pulse of about 65 μsec. to AND gate 22. A positive-going spike is then delivered to lead 18 about 34 μsec. after the occurrence of the negative-going spike. Since the monostable multivibrator 19 is still in its unstable state at this time, the positive-going spike or pulse on lead 18 is thus delivered via the enabled AND gate 22 to the set terminal of flip-flop 21. If the flip-flop 21 had previously been toggled to its reset state, it is then returned to its set state; whereas, if it had been toggled to the set state, it simply remains so set. In the set state, the (1) output lead from flip-flop 21 is energized.

The (1) output lead of flip-flop 21 is coupled to gates 23 and 24 so as to enable gate 23 and inhibit gate 24 when this lead is energized. Alternatively, when the (1) output lead is not energized, the gate 23 is disabled, but the gate 24 being no longer inhibited is in effect now enabled. The video output signal from the camera is coupled to the input of gates 23 and 24. Therefore, with flip-flop 21 in its set state, as previously described, the video signal is delivered via the enabled gate 23 and the (+1) unity gain amplifier 25 to the sync insert circuit 13. Each line of video information is coupled, in the described fashion, to the sync insert circuit 13 until the occurrence of the next vertical sync pulse.

The next vertical sync pulse is of approximately 96 μsec. duration. The leading edge of this sync pulse serves to generate a negative-going spike on lead 17, and the latter toggles the flip-flop 21 to its reset state. The monostable multivibrator 19 is also set to its unstable state so as to deliver an enabling signal of about 65 μsec. to the AND gate 22. The trailing edge of the 96 μsec. vertical sync pulse serves to generate a positive-going spike on lead 18. However, by the time this positive-going spike is generated, the monostable multivibrator 19 has already timed-out and returned to its stable state. The AND gate 22 is therefore no longer enabled and transmission therethrough is interrupted. The flip-flop 21 thus remains in its reset state and the (1) output lead therefrom is no longer energized. The gate 23 is therefore disabled, but the gate 24 is now enabled to pass the video input thereto. This video, of the second field, is coupled to sync insert circuit 13 via the (−1) unity gain, inversion amplifier 26. Accordingly, the video portion of the second and each succeeding alternate field (i.e., all even numbered fields) is inverted. The resultant composite output signal from sync insert 13 is depicted in FIG. 2*b*. Each of the other video transmitters 2 . . . N similarly generates a composite video signal such as illustrated in FIG. 2*b* and all of the composite video signals are delivered to their intended remote video receivers 1 . . . N by means including common transmission facility 14.

The composite video signal from the video transmitter 1 is delivered to the input of the video receiver 1. This video receiver comprises a conventional sync separator 28 which serves to separate the sync pulses from the video information. The separated video is coupled to the gates 38 and 39 and thence by either the (+1) amplifier 48 or the (−1) amplifier 49 to the video display 50. The vertical and horizontal sync pulses from separator 28 are delivered to the inverter control circuit 40, and to the video display 50 where they are utilized to achieve the proper display of the received video information. The inverter control 40 corresponds in circuit configuration and in operation to the inverter control 10 of the video transmitter, described hereinbefore in detail. The inverter control 40 serves to alternately enable the gates 38 and 39 so as to alternately deliver the video to display 50 via the (+1) amplifier 48 or the (−1) amplifier 49. Thus, the inverter control 40 as well as gates 38, 39 and amplifiers 48, 49 serve to invert once again those video portions of the video signal that were initially inverted at the transmitter. With the inverted video portions thus reinverted, the original version of the video signal is recovered and, in the process, the aforementioned objectionable interference is effectively neutralized.

As with the case of the video transmitters 2 . . . N, each of the video receivers 2 . . . N corresponds in circuit configuration and mode of operation to video receiver 1.

While video transmission in only one direction has been discussed, it will be obvious that the same inversion-reinversion technique can be utilized for the other direction of video transmission.

It perhaps should be noted that the vertical sync pulses of one channel will also create some interference in another channel because of crosstalk and/or intermodulation distortion between juxtaposed video channels. However, unlike the horizontal sync pulses, the vertical sync pulses occur at quite a low repetition rate (i.e., once per field) and therefore they are not particularly bothersome.

The foregoing description has been in terms of a field-to-field video inversion operation since the PICTUREPHONE set employs two interlaced fields per displayed frame. However, it should be apparent that the video inversion-reinversion technique of the invention could also be readily utilized in a sequential line-by-line scan arrangement (i.e., non-interlaced). In the latter, the video portion of each composite video signal would be inverted in every other frame prior to transmission, and reinversion would then take place for these alternate frames. It is, therefore, to be understood that the foregoing disclosure relates to only a preferred embodiment of the invention and that numerous modifications or alterations may be made therein without departing from the spirit and scope of the invention.

What is claimed is:

1. A video communications system comprising a plurality of similar video transmitters each of which serves to generate a composite video signal having video portions each representative of a line of an image and interspersed vertical and horizontal synchronization pulses the vertical synchronization pulses of each composite video signal preceding successive fields of the same and alternating in duration between two predetermined values for successive fields; a common transmission facility having a plurality of closely juxtaposed transmission channels for respectively carrying the composite video signals of said transmitters to remote video receivers, the juxtaposition between transmission channels being such that horizontal synchronization pulses appearing in one channel produce interference spikes in adjacent channels; each transmitter having coupling means for inverting the video portions of the composite video signal in every other field prior to coupling the same to said common transmission facility, said coupling means comprising a video inverting coupling path and a non-inverting coupling path, a flip-flop for alternately and successively enabling and disabling said inverting and non-inverting video paths, and control means operative in response to successive vertical synchronization pulses of one given duration to set said flip-flop to a first state and operative in response to the successive alternately-occurring vertical synchronization pulses of the other duration to set said flip-flop to a second state, said flip-flop being connected to said inverting and non-inverting video paths and serving in said first state to disable said inverting path and to enable said non-inverting path and in said second state to enable said inverting path and to disable said non-inverting path, whereby the video portions of each composite video signal are inverted in every other field; a plurality of similar remote video receivers coupled to said common transmission facility for respectively displaying the video signals from said plurality of video transmitters; each receiver including a coupling means, a flip-flop and a control means connected in the same circuit configuration as the aforementioned transmitter coupling means, flip-flop and control means, said receiver coupling means, flip-flop and control means being similarly operative in response to the successive alternating vertical synchronization pulses of the received composite video signal to invert the video portions thereof in every other field prior to the display of the same whereby the video portions of the composite video signal inverted prior to transmission are reinverted prior to the receiver display of the same.

* * * * *